United States Patent
Kumar et al.

(10) Patent No.: US 7,000,102 B2
(45) Date of Patent: Feb. 14, 2006

(54) PLATFORM AND METHOD FOR SUPPORTING HIBERNATE OPERATIONS

(75) Inventors: Mohan J. Kumar, Aloha, OR (US); Shivnandan D. Kaushik, Portland, OR (US); James B. Crossland, Banks, OR (US); Linda J. Rankin, Portland, OR (US); David J. O'Shea, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 09/895,580

(22) Filed: Jun. 29, 2001

(65) Prior Publication Data

US 2003/0018923 A1    Jan. 23, 2003

(51) Int. Cl.
G06F 9/445 (2006.01)
G06F 1/26 (2006.01)

(52) U.S. Cl. .......................................... 713/2; 713/323
(58) Field of Classification Search .................... 713/1, 713/2, 300, 323, 320, 324, 100; 710/260
See application file for complete search history.

(56) References Cited

U.S. PATENT DOCUMENTS

| | | | | |
|---|---|---|---|---|
| 5,269,022 A * | 12/1993 | Shinjo et al. | ................... | 713/2 |
| 5,666,540 A | 9/1997 | Hagiwara et al. | ............ | 713/323 |
| 5,708,820 A | 1/1998 | Park et al. | ................... | 713/323 |
| 5,748,971 A | 5/1998 | Choi et al. | .................. | 713/320 |
| 5,778,443 A | 7/1998 | Swanberg et al. | .......... | 711/162 |
| 5,784,628 A * | 7/1998 | Reneris | ....................... | 713/300 |
| 5,805,910 A | 9/1998 | Lee et al. | ................... | 713/323 |
| 5,809,223 A | 9/1998 | Lee et al. | ...................... | 714/4 |
| 5,812,821 A | 9/1998 | Sugi et al. | ..................... | 703/25 |
| 5,822,582 A | 10/1998 | Doragh et al. | .................. | 713/2 |
| 5,822,600 A | 10/1998 | Hallowell et al. | .......... | 713/340 |
| 5,832,281 A * | 11/1998 | Maeda | ........................ | 713/300 |
| 5,845,134 A * | 12/1998 | Arai | ............................ | 713/322 |
| 5,862,350 A | 1/1999 | Coulson | | |
| 5,875,344 A | 2/1999 | Madina | ...................... | 713/300 |
| 5,920,728 A | 7/1999 | Hallowell et al. | .......... | 713/340 |
| 5,925,130 A | 7/1999 | Frame et al. | ............... | 713/300 |
| 5,933,134 A | 8/1999 | Shich | .......................... | 345/173 |
| 5,944,828 A | 8/1999 | Matsuoka | ................... | 713/323 |
| 5,963,219 A | 10/1999 | Choi | .......................... | 345/501 |
| 5,974,552 A | 10/1999 | Lim et al. | ................... | 713/300 |
| 5,978,922 A | 11/1999 | Arai et al. | .................. | 713/323 |
| 5,978,923 A | 11/1999 | Kou | | |
| 5,995,139 A | 11/1999 | Lee | ............................ | 348/143 |
| 5,996,082 A | 11/1999 | Cortopassi | .................. | 713/321 |
| 6,021,179 A | 2/2000 | Lee | ............................ | 379/82 |
| 6,049,884 A | 4/2000 | Tsuji | .......................... | 713/323 |
| 6,072,250 A | 6/2000 | Thandiwe et al. | .......... | 307/150 |
| 6,209,088 B1 * | 3/2001 | Reneris | ......................... | 713/1 |
| 6,226,667 B1 | 5/2001 | Matthew et al. | ............ | 709/203 |

(Continued)

*Primary Examiner*—Thuan Du
(74) *Attorney, Agent, or Firm*—Blakely, Sokoloff, Taylor & Zafman LLP

(57) ABSTRACT

One aspect of the invention relates to a method for supporting hibernation despite the presence of hot-plugged nodes and non-deterministic boot operations. The method comprises invoking a management interrupt in response to a Hibernate request. The management interrupt is used to obtain and store platform configuration information into a non-volatile storage location. The platform configuration information includes data to indicate whether a next boot sequence for a platform occurs as a deterministic boot sequence or a non-deterministic boot sequence as well as a boot node identifier and a listing of an order in which processors of the platform are initialized.

17 Claims, 5 Drawing Sheets

U.S. PATENT DOCUMENTS

| | | | |
|---|---|---|---|
| 6,369,547 B1 | 4/2002 | Suzuki et al. | 320/132 |
| 6,385,721 B1 | 5/2002 | Puckette | 713/2 |
| 6,502,109 B1 | 12/2002 | Aravamudan et al. | 707/206 |
| 6,523,125 B1 | 2/2003 | Kohno et al. | 713/320 |
| 6,546,472 B1 | 4/2003 | Atkinson et al. | 711/156 |
| 6,609,182 B1 | 8/2003 | Pedrizetti et al. | 711/159 |
| 6,611,858 B1 | 8/2003 | Aravamudan et al. | 709/203 |
| 6,647,472 B1 | 11/2003 | Atkinson et al. | 711/158 |
| 6,877,074 B1 | 4/2005 | Naitoh et al. | 711/154 |
| 6,894,600 B1 | 5/2005 | Phelan | 340/10.34 |
| 6,927,555 B1 | 8/2005 | Johnson | 320/134 |
| 2002/0062455 A1* | 5/2002 | Lee | 713/323 |

\* cited by examiner

PLATFORM AND METHOD FOR SUPPORTING HIBERNATE OPERATIONS

FIELD

This invention relates to the field of server availability. In particular, the invention relates to a platform featuring hot-plug capable multi-node architecture that supports hiberation.

BACKGROUND

Advances in technology have opened up many opportunities for applications that go beyond the traditional ways of doing business. Electronic commerce over the Internet has become widely accepted, requiring many companies to either install one or more servers to host a web site and maintain accessible databases or to contract with data centers to provide such services. Important functional characteristics for these servers include reliability, availability and serviceability.

A loss of power adversely effects the availability of a server, which is especially costly when such power loss occurs for a server that is responsible for handling mission critical applications. To enhance availability during a power loss condition, critical servers may be equipped with back-up power functionality to allow that server to save its operational states before power-down. Availability may further be enhanced by supporting hibernate.

Initiated by an operating system (OS) of the server, "Hibernate" is a low-power, long wakeup-latency sleeping state where server hardware has powered off most devices. Hibernate is also referred to as "S4" in accordance with terminology set forth by the Advanced Configuration and Power Interface (ACPI) Specification (Version 2.0) published Jul. 27, 2000.

Prior to entering Hibernate, various hardware states of the server as well as its stored contents are copied and stored as an image on its hard disk. Hence, during a wakeup operation, the server may be quickly restored to an operating state that existed prior to entering Hibernate. For correct operation, the OS expects to see the same hardware configuration on resume as was prior to hibernate. However, hot-plug capable multi-node architectures normally do not conduct Hibernate operations for a variety of reasons.

One reason is that, to allow maximum availability, multi-processor servers should conduct boot operations is a non-deterministic manner. In other words, the selection of which processor controls a platform boot operation at one point in time may differ from which processor is selected at a later point in time. As a result, the configuration of the platform after resuming from Hibernate is not guaranteed to match its pre-Hibernate configuration at a first time period.

For example, the order in which nodes of the platform are recognized by the operating system (OS) of the platform at the first time period may differ from how these nodes are recognized by the OS at the second time period. Each node being a collection of interconnected components. Thus, if the nodes differ, the logical identifier (ID) for processors assigned by the OS would differ, which greatly complicates returning the platform back to its pre-Hibernate configuration. Moreover, the amount of memory assigned to a particular node may differ (since the boot node may be different) and the number of processors on the boot node may be different (since the boot node may be different).

BRIEF DESCRIPTION OF THE DRAWINGS

The features and advantages of the present invention will become apparent from the following detailed description of the present invention in which.

DESCRIPTION

The invention relates to a platform and method for supporting hibernation despite the presence of hot-plugged nodes and non-deterministic boot operations. Herein, certain details are set forth in order to provide a thorough understanding of the invention. It is apparent to a person of ordinary skill in the art, however, that the invention may be practiced through many embodiments other that those illustrated. Well-known circuits and ACPI parameters are not set forth in detail in order to avoid unnecessarily obscuring the invention.

In the following description, terminology is used to discuss certain features of the present invention. For example, a "platform" includes hardware equipment and/or software that process data. One type of platform is a computer such as a server, although other types of hardware equipment may employ aspects of the invention. A "software module" includes instructions or code that, when executed, performs one or more selected functions. Each software module is stored in platform readable medium, namely any medium that can store or transfer information. Examples of platform readable medium include, but are not limited or restricted to an electronic circuit, a semiconductor memory device, volatile or non-volatile memory, a floppy diskette, a compact disk, an optical disk, a hard drive disk, or any type of link (described below).

In addition, a "node" is a collection of interconnected components. These components may include active components (e.g., integrated circuit, timing or clocking components, etc.) as well as passive component (e.g., resistors, capacitors, inductors, etc.). A "link" is broadly defined as any type of information-carrying medium such as electrical wire, optical fiber, cable, trace bus or even wireless signaling technology. In addition, the term "hot-plug" or any tense thereof indicates a characteristic where a device may be added, removed or replaced while the OS of the platform continues to operate.

I. Platform Hardware Architecture Overview

Figure 1A:
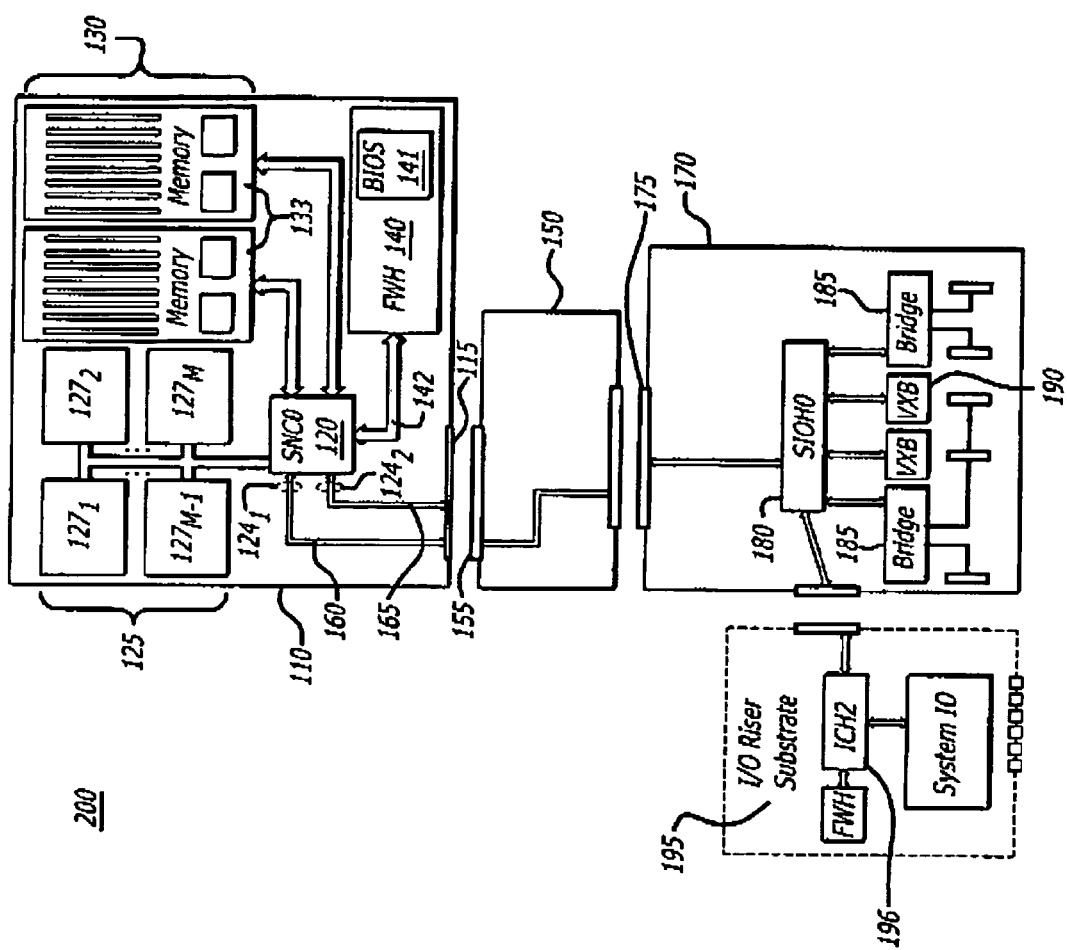
FIGS. 1A and 1B are exemplary embodiments of a substrate layout for a platform utilizing the invention.

Referring to FIG. 1A, a first exemplary embodiment of a platform utilizing the invention is shown. The platform 100 comprises a processor substrate 110, an input/output (I/O) substrate 170 and an interconnection substrate 150 that couples devices mounted on the processor substrate 110 with those on the I/O substrate 170. Each "substrate" is formed from any type of material or combination of materials upon which integrated circuits as well as a wide variety of other types of devices (e.g., passive, sockets, timing, etc.) can be attached. Each substrate may be produced in a number of form factors such as, for example, a circuit board acting as a motherboard or a removable daughter card, and the like.

Figure 2:
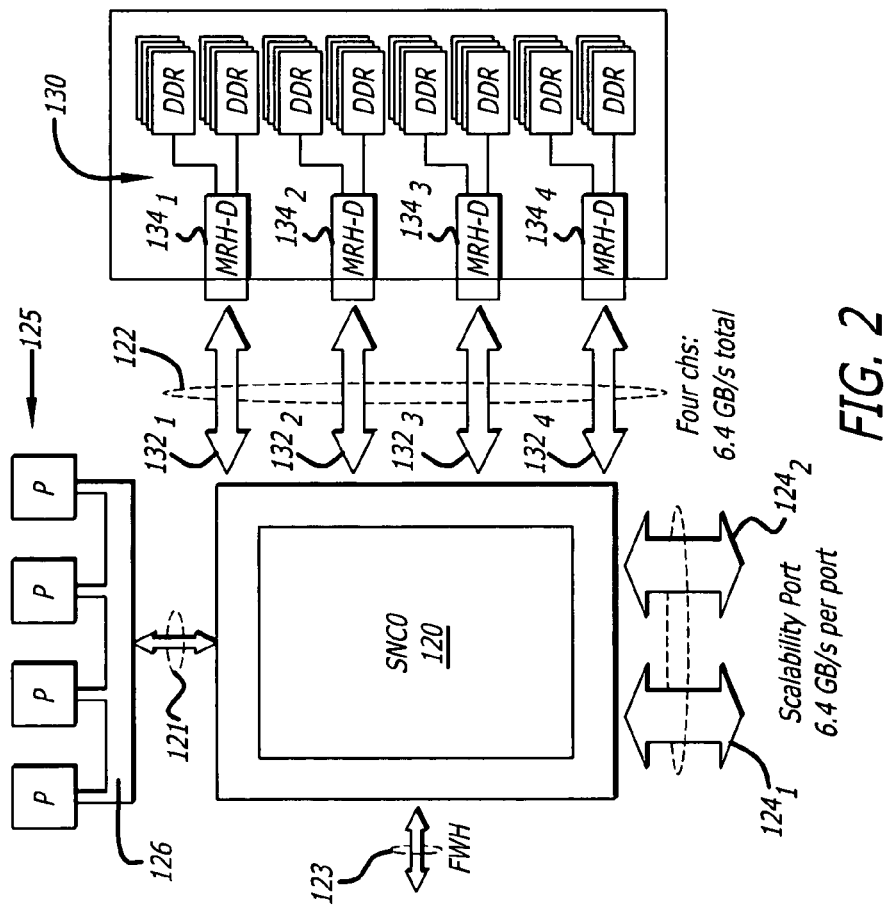
FIG. 2 is an exemplary embodiment of a scalability node controller implemented within the platform of FIG. 1.

As shown, the processor substrate 110 comprises a first scalable node controller (SNC0) 120 that is configured with hot-plug capability as shown in FIG. 2. SNC0 120 is coupled to a connector 115 placed at an edge of the substrate 110. This connector 115 is adapted for coupling with a mating connector 155 placed on the interconnection substrate 150. SNC0 120 is further coupled to a processor cluster 125 supporting processors $127_1$–$127_M$ ("M" being a positive integer), a local memory cluster 130 having one or more banks of memory 133 and a firmware hub 140. The firmware hub 140 is configured to store a portion of Basic Input/Output System (BIOS) code 141 for partial initialization of components and enablement of links therefrom as described in FIG. 2.

Referring still to FIG. 1A, SNC0 120 features two scalability port interfaces $124_1$ and $124_2$ (see also FIG. 1B) that are both coupled to connector 115 via links 160 and 165. This enables data to be routed from SNC0 120 to a Server Input/Output Hub (SIOH) 180 via connectors 115 and 155 as well as connector 175 of I/O substrate 170. SIOH0 180 provides communications with high-speed links. For example, SIOH0 180 provides coupling to one or more bridges 185 (e.g., P64H2 devices) that support communications with one or more I/O buses such as a Peripheral Component Interconnect "PCI" bus and/or a higher speed PCI bus which is referred to as the "PCI-X bus" for example. SIOH0 180 further provides coupling to a virtual interface bridge (VXB) 190 (also referred to as "host channel adapter") and an I/O Riser substrate 195 having an input/output control hub (ICH2) 196 mounted thereon. The VXB 190 provides a four 10-bit system J/O full-duplex channels. ICH2 196 supports a number of functions that are designed to support platform security in addition to traditional I/O and platform boot functions. TCH2 196 enables communications with a boot flash (not shown) containing portions of the BIOS code, networking ports as well as various I/O peripherals such as a mouse, alphanumeric keyboard, and the like (not shown).

Figure 1B:
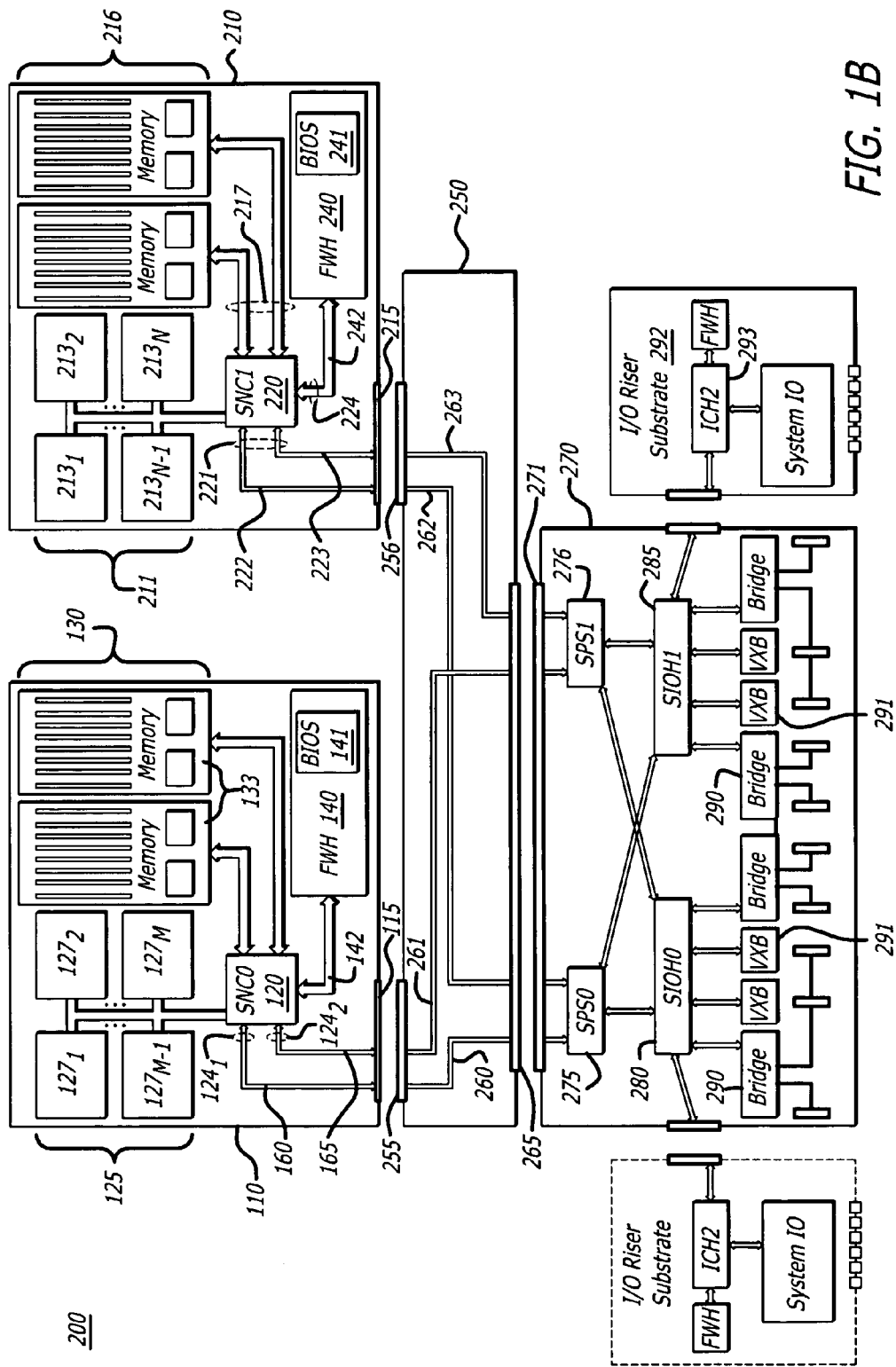

Referring now to FIG. 1B, another exemplary embodiment of a substrate layout of a platform utilizing the invention is shown. Platform 200 is configured to support multiple processor substrates. For this embodiment, as shown, platform 200 comprises first processor substrate 110 and a second processor substrate 210, both coupled to a multi-substrate interconnection substrate 250. The multi-substrate interconnection substrate 250 is coupled to an I/O substrate 270. One of these processor substrates 110 and 210 operates as a "boot node" that is responsible for electing one of its processor components as the boot strap processor for handling the BIOS boot sequence.

More specifically, as shown in both FIGS. 1B and 2, first processor substrate 110 comprises SNC0 120 coupled to processor cluster 125, local memory cluster 130, firmware hub 140 and connector. SNC0 120 comprises a plurality of port interface that, when activated, enable communications over different links. For example, a processor port interface 121 of SNC0 120 provides a communication path to processors $127_1$–$127_M$ of processor cluster 125 via processor link 126. Memory port interface 122 of SNC0 120 provides a communication path to local memory cluster 130 via a memory link 131. In one embodiment, memory link 131 provides four communication sub-links $132_1$–$132_4$ supporting a total data throughput of approximately 6.4 Gigabytes per second (GB/s). Each of the sub-links $132_1$, ..., $132_4$ may be coupled to a bank of local memory devices 133 (e.g., RDRAM) or a memory repeater hub $134_1$, ..., $134_4$ that operates as an RDRAM-to-SDRAM translation bridge.

SNC0 120 further includes a first scalability port interface $124_1$ that enables a communication path over link 260 to a first scalability port switch (SPS0) 275 via connector 115 and mating connector 255. SNC0 also includes a second scalability port interface $124_2$ that enables a communication path over link 261 to a second scalability port switch (SPS1) 276 via connectors 115 and 255.

As further shown in FIGS. 1B and 2, SNC0 120 comprises a port interface 123 that enables a communication path to firmware hub 140 via link 142. Firmware hub 140 comprises BIOS 141 that is configured to initialize processors $127_1$–$127_M$, local memory 133, and scalability port interfaces $124_1$ and $124_2$ to communicate with the OS. As a result, the distributed BIOS 141 enables hot-plug addition of a boot node (e.g., first processor substrate 110) and supports hot-plug functionality and dynamic partitioning of platform 200.

Similar in architecture to first processor substrate 110, second processor substrate 210 comprises a second scalable node controller (SNC1) 220 that is mounted on a substrate and coupled to a processor cluster 211, a local memory cluster 216, a firmware hub 240 as well as a connector 215. Connector 215 is adapted to couple with a second mating connector 256 of interconnection substrate 250.

As shown in FIG. 1B, processor cluster 211 comprises a processor link 212 interconnecting one or more processors $213_1$–$213_N$ ("N" being a positive integer). It is contemplated that these N processors may equal in number to the M processors provided by first processor substrate 110, although such a 1:1 correlation is not necessary. Processor cluster 211 is coupled to a processor port interface of SNC1 220 via processor link 212. Local memory cluster 216 is coupled to a memory port interface of SNC1 220 through a memory link 217. SNC 1 220 features two scalability port interfaces 221 that are both coupled to connector 215 via links 222 and 223.

As further shown in FIG. 1B, SNC1 220 comprises a port interface 224 that enables a communication path to firmware hub 240 via link 242. Firmware hub 240 comprises a portion of BIOS code 241 that is configured to initialize processors $213_1$–$213_N$, local memory 218, and scalability port interfaces 222 and 223 to support communications with the OS when a hot-plugged operation occurs involving the second processor substrate 110. The portion of BIOS code 241 enables hot-plug addition of another potential boot node (e.g., second processor substrate 210).

Referring still to FIG. 1B, interconnection substrate 250 enables data to be propagated from SNC0 120 to both SPS0 275 and SPS1 276. In particular, first mating connector 255 receives data transferred through connector 115 and propagates that data over links 260 and 261. Links 260 and 261 are coupled to a connector 265 of interconnection substrate 250. The connector 265 may be coupled to a mating connector 271 of I/O substrate 270, which propagates the data from links 260 and 261 to SPS0 275 and SPS1 276, respectively. Similarly, in a redundant fashion, interconnection substrate 250 enables data to be propagates from SNC1 220 to SPS0 275 and SPS1 276 over links 262 and 263, respectively.

Figure 3:
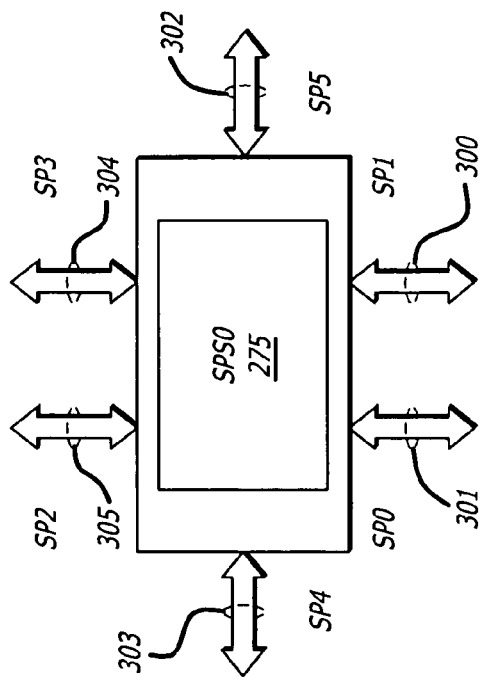
FIG. 3 is an exemplary embodiment of a scalability port switch implemented within the platform of FIG. 1.

As shown in FIG. 3, in one embodiment, SPS0 275 and/or SPS1 276 is a crossbar switch (e.g., integrated 6×6 crossbar) that enables communication with components over six port interfaces 300–305. For example, with this embodiment, each scalability port switch would enable communications between four SNCs and two SIOHs. Both SPS0 275 and SPS1 276 are programmed by accessing internal control and status registers via PCI configuration interface, System Management Bus (SMBus) interface, or Joint Test Action Group (JTAG) interface.

Referring back to FIG. 1B, I/0 substrate 270 comprises SPS0 275 and SPS1 276, each coupled to a first Server Input/Output Hub (SIOH0) 280 and a second Server Input/Output Hub (SIOH1) 285. As previously described, both SIOH0 280 and SIOH1 285 provide communications with high-speed links. For example, SIOH1 285 provides coupling to one of more of the following: (1) one or more bridges 290 (e.g., P64H2 devices) that support communications with one or more I/O buses; (2) a virtual interface bridge (VXB) 291 that provides system I/O full-duplex channels; and/or (3) an I/O Riser substrate 292 having an input/output control hub (ICH2) 293 mounted thereon.

II. Hibernate Operations

Figure 4:
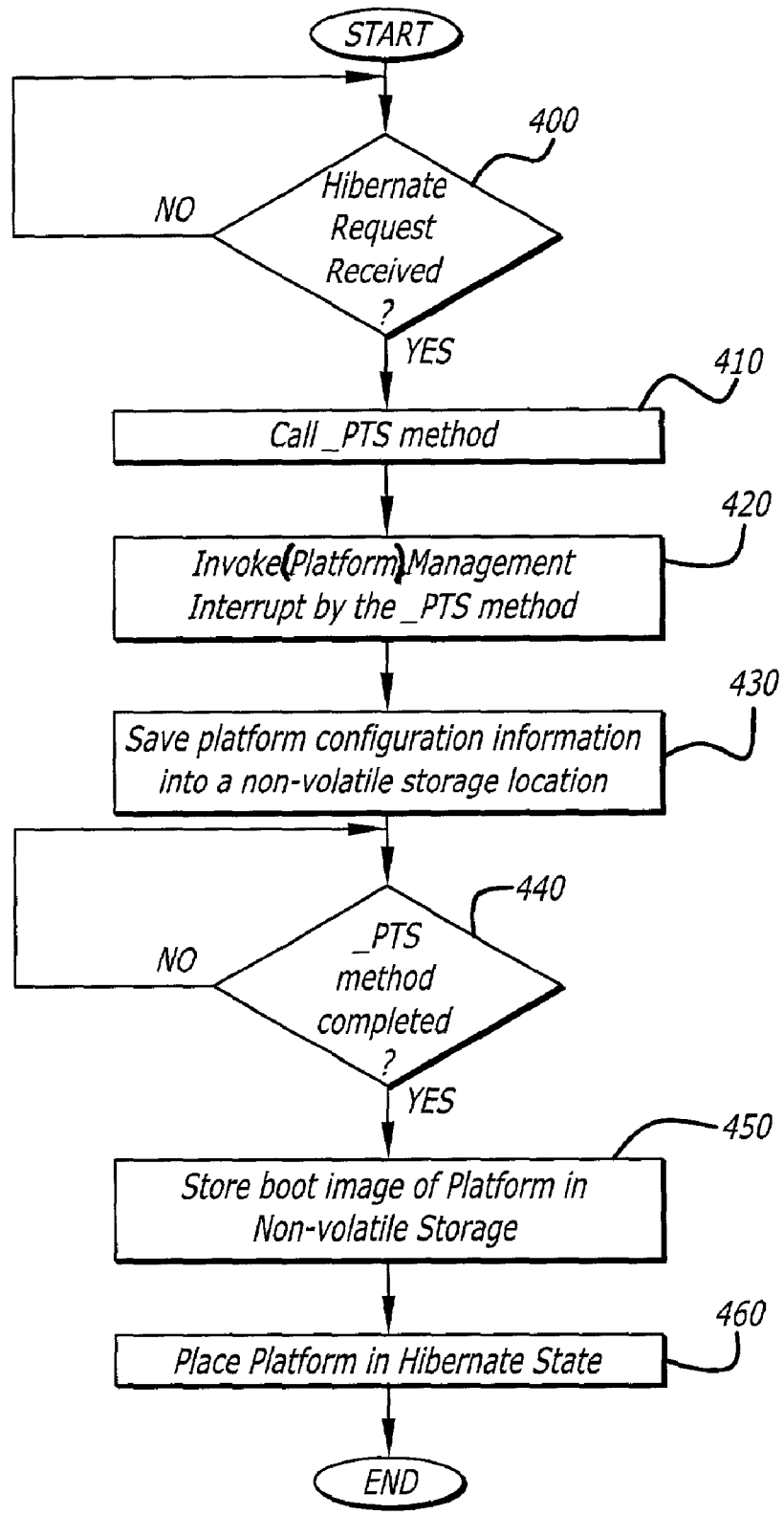
FIG. 4 is an exemplary embodiment of a flowchart representation of conducting a management interrupt in response to a Hibernate request.

Referring now to FIG. 4, a flowchart representation of conducting a management interrupt (e.g., Platform Management Interrupt "PMI" or System Management Interrupt "SMI") in response to a Hibernate request is shown. Herein, in response to a Hibernate request by a processor, a function call for a Prepare to Sleep (_PTS) control method of an ACPI based-interface is made by the OS (blocks 400 and 410). The _PTS control method invokes a management interrupt (block 420). The management interrupt runs in the BIOS context and saves certain information (referred to herein as the "platform configuration information") into a non-volatile storage location (block 430). An illustrative example of certain data that may be contained in the platform configuration information is shown in Table A below. The non-volatile storage location may include a set of registers, addressed locations of non-volatile memory shared by the BIOS and the like.

TABLE A

| Storage Element | Function |
| --- | --- |
| Boot Flags | At least one of the boot flags, when set, indicates if next boot sequence will be a Resume from Hibernate. |
| External Task Priority Registers | These registers define the redirectable interrupt priority for Advanced Programmable Interrupt Controller (APIC) agents on the node |
| Boot Node ID | A unique value to identify which node operates as the boot node |
| Processor ID/Order | Listing of the unique identifiers assigned to each processor and their order of initialization during the previous boot sequence |
| Memory Interleave Registers | Defines the home node for every main memory address |
| IOH_MAP | This register maps a server input/output hub (SIOH0 or SIOH1) to physical ports. |
| REM_CDEF | This register defines whether a port of a scalability port switch is coupled to a SIOH or a SNC. |

Next, a determination is made whether the _PTS control method has completed (block 440). If so, the boot image of the platform is stored in non-volatile storage and the OS places the platform into a Hibernate state (blocks 450 and 460).

Figure 5:
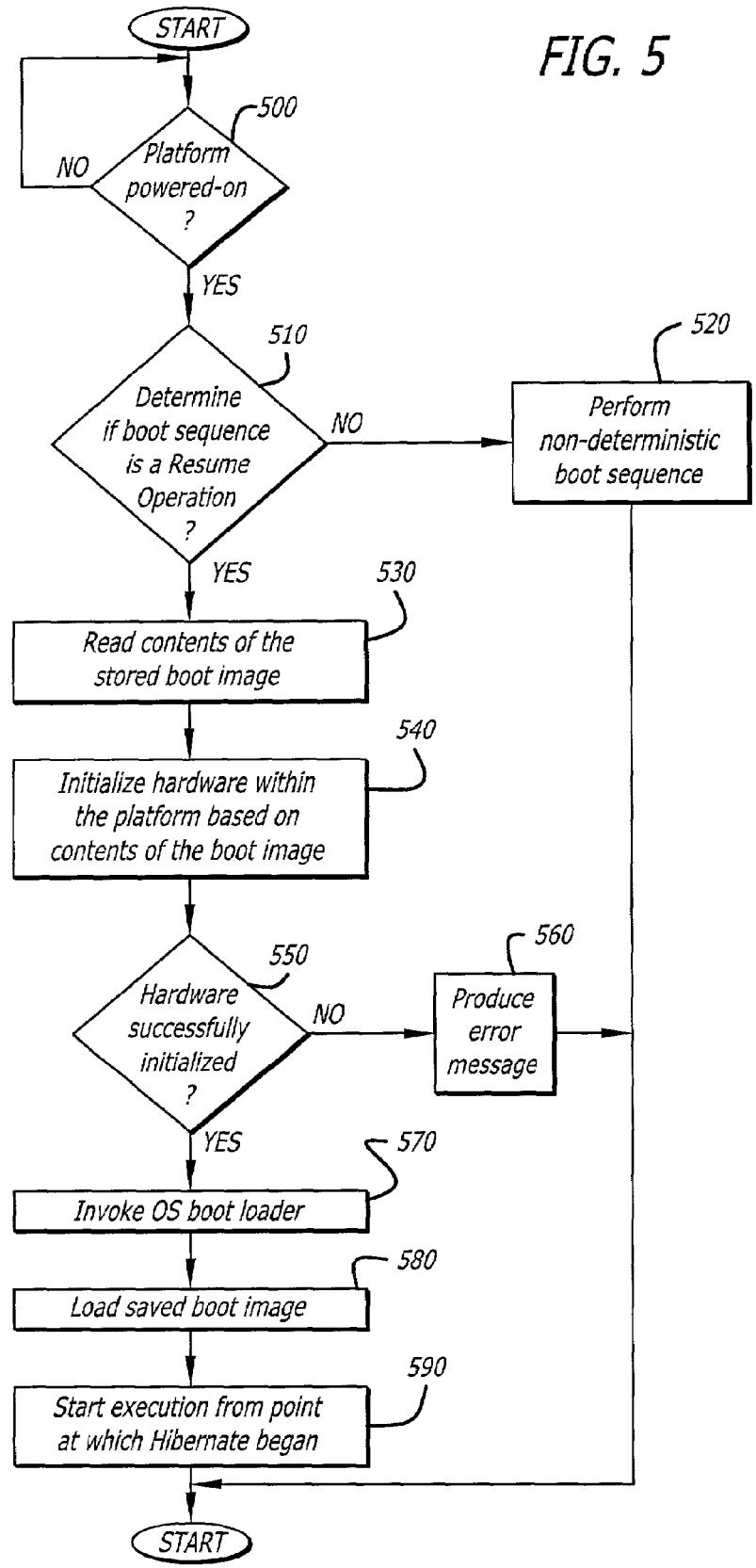
FIG. 5 is an exemplary embodiment of a flowchart representation of conducting a Resume operation to return the platform to its normal operational state from the Hibernate state.

Referring now to FIG. 5, a flowchart representation of a Resume sequence for booting the platform from a Hibernate state is shown. Herein, as one embodiment, the platform is powered on and BIOS runs and checks at least one boot flag to determine if this boot sequence is a Resume operation (blocks 500 and 510). If the boot sequence is not a Resume operation, the platform performs a non-deterministic boot sequence in which the order of processor initialization as well as the selected boot strap processor may differ from that prior to entering the Hibernate state (block 520). If the boot sequence is a Resume operation, the platform performs a deterministic boot sequence by reading the contents of the stored boot image from the non-volatile memory storage location and initializing hardware within the platform accordingly (blocks 530 and 540).

In the event that the hardware of the platform cannot be configuration with the contents of the stored boot image, a print error message is produced for display to the user or perhaps placement into an internal error log within the platform (blocks 550 and 560). After hardware initialization has completed, an OS boot loader is invoked, the saved boot image is loaded and execution is started from where the OS left off prior to entering the Hibernate state (blocks 570, 580 and 590).

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   invoking a management interrupt in response to a Hibernate request; and
   storing platform configuration information into a non-volatile storage location, the platform configuration information including data to indicate whether a next boot sequence for a platform occurs as a deterministic boot sequence or a non-deterministic boot sequence where an order of processor initialization for the platform after hibernation differs from an order of processor initialization for the platform for a boot sequence, the non-deterministic boot sequence further uses a boot strap processor that differs from a processor that conducted a boot sequence prior to placing the platform into the Hibernate state.

2. The method of claim 1 further comprising storing a boot image of a platform including a first hot-plug processor substrate and a second hot-plug processor substrate.

3. The method of claim 2 further comprising placing the platform into a Hibernate state.

4. The method of claim 3, wherein the deterministic boot sequence uses a boot strap processor that conducted a boot sequence prior to placing the platform into the Hibernate state.

5. The method of claim 3 further comprising:
   exiting from the Hibernate state by checking the platform configuration information to determine if a current boot sequence is a deterministic boot sequence and if so, using a boot strap processor that conducted a boot sequence prior to placing the platform into the Hibernate state.

6. The method of claim 2, wherein the platform configuration information further includes a boot node identifier and information as to an order of initialization of processors employed on the first processor substrate and the second processor substrate.

7. The method of claim 1, wherein prior to invoking of the management interrupt, the method further comprising making a function call to a Prepare to Sleep (_PTS) control method that invokes the management interrupt.

8. A software stored in platform readable medium executed by at least one processor within a platform, the software comprising:
a first software module to invoke a management interrupt in response to a Hibernate request;
a second software module to store platform configuration information into a non-volatile storage location, the platform configuration information including data to indicate whether a next boot sequence for a platform occurs as a deterministic boot sequence or a non-deterministic boot sequence where an order of processor initialization for the platform after hibernation differs from an order of processor initialization for the platform for a boot sequence prior to the hibernation, the non-deterministic boot sequence uses a boot strap processor, differing from a processor that conducted a boot sequence prior to placing the platform into a Hibernate state, to control the next boot sequence; and
a third software module to place the platform into the Hibernate state.

9. The software of claim 8 further comprising a third software module to initiate a function call to a Prepare to Sleep (_PTS) control method that, in turn, invokes the management interrupt.

10. The software of claim 8 further comprising:
a fourth software module to exit from the Hibernate state by checking the platform configuration information to determine if a current boot sequence is a deterministic boot sequence and if so, using a boot strap processor that conducted a boot sequence prior to placing the platform into the Hibernate state to control the current boot sequence.

11. The software of claim 8, wherein the platform configuration information further includes a boot node identifier and information as to an order of initialization of processors employed on the platform.

12. A platform comprising:
a plurality of hot-plug processor substrates collectively having a plurality of processors, one of the plurality of processors to request the platform to enter into a Hibernate state; and
an input/output (I/O) substrate including a non-volatile memory, the non-volatile memory being loaded with platform configuration information including data to indicate whether a next boot sequence for a platform occurs as a deterministic boot sequence or a non-deterministic boot sequence prior to entering the Hibernate state, the non-deterministic boot sequence is where an order of initialization of the plurality of processors after hibernation during the next boot sequence differs from an order of initialization of the plurality of processors for a boot sequence prior to the platform entering the Hibernate state, the non-deterministic boot sequence further uses a boot strap processor, differing from the one of the plurality of processors to request the platform to enter into the Hibernate state, to conduct the boot sequence prior to placing the platform into a Hibernate state, to control the current boot sequence.

13. The platform of claim 12, wherein the non-volatile memory further comprises a boot image of a platform loaded prior to entering the Hibernate state.

14. The platform of claim 12, wherein the non-volatile memory further comprises a Basic Input/Output System (BIOS).

15. The platform of claim 14, wherein, after power-on of the platform, the BIOS runs and checks the data associated with the platform configuration information to determine if a current boot sequence occurs as a deterministic boot sequence.

16. The platform of claim 15, wherein, in accordance with the deterministic boot sequence, a boot strap processor, being one of the plurality of processors that conducted a boot sequence prior to placing the platform into the Hibernate state, controls the current boot sequence.

17. The platform of claim 12, wherein the platform configuration information further includes a boot node identifier to uniquely identify at least each of the plurality of processor substrates and information as to an order of initialization of the plurality of processors.

* * * * *

UNITED STATES PATENT AND TRADEMARK OFFICE
CERTIFICATE OF CORRECTION

| | | |
|---|---|---|
| PATENT NO. | : 7,000,102 B2 | Page 1 of 1 |
| APPLICATION NO. | : 09/895580 | |
| DATED | : February 14, 2006 | |
| INVENTOR(S) | : Kumar et al. | |

It is certified that error appears in the above-identified patent and that said Letters Patent is hereby corrected as shown below:

In column 3, at line 30, delete "PCT-X" and insert --PCI-X--.
In column 3, at line 35, delete "J/O" and insert --I/O--.
In column 3, at line 38, delete "TCH2" and insert --ICH2--.

Signed and Sealed this

Sixth Day of November, 2007

JON W. DUDAS
*Director of the United States Patent and Trademark Office*